(12) United States Patent
Maalouli et al.

(10) Patent No.: US 11,114,108 B1
(45) Date of Patent: Sep. 7, 2021

(54) ACOUSTIC SOURCE CLASSIFICATION USING HYPERSET OF FUSED VOICE BIOMETRIC AND SPATIAL FEATURES

(71) Applicant: Cirrus Logic International Semiconductor Ltd., Edinburgh (GB)

(72) Inventors: Ghassan Maalouli, Scottsdale, AZ (US); Samuel P. Ebenezer, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/871,698

(22) Filed: May 11, 2020

(51) Int. Cl.
| | |
|---|---|
| *G10L 21/02* | (2013.01) |
| *H04R 3/00* | (2006.01) |
| *G06K 9/00* | (2006.01) |
| *G10L 21/0316* | (2013.01) |
| *G10L 21/0364* | (2013.01) |
| *G10L 21/0208* | (2013.01) |
| *G10L 21/0216* | (2013.01) |

(52) U.S. Cl.
CPC ...... *G10L 21/0202* (2013.01); *G06K 9/00288* (2013.01); *G10L 21/02* (2013.01); *G10L 21/0316* (2013.01); *G10L 21/0364* (2013.01); *H04R 3/005* (2013.01); *G10L 2021/02087* (2013.01); *G10L 2021/02166* (2013.01); *G10L 2021/03643* (2013.01); *G10L 2021/03646* (2013.01)

(58) Field of Classification Search
CPC . G10L 21/02; G10L 21/0364; G10L 21/0316; G10L 2021/03646; G10L 2021/03643; G10L 2021/02087; G10L 2021/02166; H04R 3/005; G06K 9/00288
See application file for complete search history.

(56) References Cited

U.S. PATENT DOCUMENTS

| | | | |
|---|---|---|---|
| 9,269,368 B2 | 2/2016 | Chen et al. | |
| 9,589,197 B2 | 3/2017 | Prodam et al. | |
| 10,142,730 B1 | 11/2018 | Yousefian et al. | |
| 2014/0278397 A1* | 9/2014 | Chen | G10L 21/02 |
| | | | 704/233 |
| 2019/0096429 A1* | 3/2019 | Kowali | G01S 3/8006 |

\* cited by examiner

*Primary Examiner* — Yogeshkumar Patel
(74) *Attorney, Agent, or Firm* — E. Alan Davis; James W. Huffman (57) ABSTRACT

A method includes extracting, from multiple microphone input, a hyperset of features of acoustic sources, using the extracted features to identify separable clusters associated with acoustic scenarios, and classifying subsequent input as one of the acoustic scenarios using the hyperset of features. The acoustic scenarios include a desired spatially moving/non-moving talker, and an undesired spatially moving/non-moving acoustic source. The hyperset of features includes both spatial and voice biometric features. The classified acoustic scenario may be used in a robotics application or voice assistant device desired speech enhancement or interference signal cancellation. Specifically, the classification of the acoustic scenarios can be used to adapt a beamformer, e.g., step size adjustment. The hyperset of features may also include visual biometric features extracted from one or more cameras viewing the acoustic sources. The spatial and biometric features may be separately extracted, clustered, classified and their separate classifications fused, e.g., using frame synchronization.

20 Claims, 8 Drawing Sheets

ACOUSTIC SOURCE CLASSIFICATION USING HYPERSET OF FUSED VOICE BIOMETRIC AND SPATIAL FEATURES

BACKGROUND

In a smart-home application, for example, hands-free voice communications typically occur in noisy far-field conditions. For example, the desired talker's voice may be interfered with by competing talkers, television (TV), a dishwasher, vacuum cleaner, etc. Spatial processing systems may improve signal-to-noise ratio, e.g. adaptive beamformers. Robust system controls are essential in an effective adaptive spatial processing method. Naïve voice activity detections alone may be insufficient.

Noise clustering methods in the spatial domain are being used in state-of-the-art control systems. The control systems dynamically track the inter-microphone phase profile of various noises present in the environment. The inter-microphone frequency-dependent phase profile is the phase of the cross-power spectral density of the microphone signals, and is a unique function of frequency for each source location relative to the microphones, and may be calculated by taking the phase of the time-averaged product of the Fourier transform of one microphone signal and the conjugated Fourier transform of the other microphone signal. The control systems may assume noise sources are spatially non-moving where fluctuations in the inter-microphone phase are used to detect the presence of long-term non-moving sources. The control systems can wrongly classify a non-moving talker as a noise cluster and wrongly classify a moving noise source as a desired talker.

SUMMARY

Embodiments are described that recognize and cluster acoustic sources based not only on whether they are moving or non-moving, but also on their identity determined using biometric features of a talker. For example, different acoustic scenarios may be identified such as: desired and spatially non-moving, desired and spatially moving, undesired and spatially non-moving, and undesired and spatially moving.

In one embodiment, the present disclosure provides a method including extracting, from input of multiple microphones, a hyperset of features of acoustic sources. The hyperset of features comprises one or more spatial features of the acoustic sources and one or more voice biometric features of the acoustic sources. The method also includes using the extracted hyperset of features to identify separable clusters associated with acoustic scenarios. The acoustic scenarios comprise a desired spatially non-moving talker, a desired spatially moving talker, an undesired spatially non-moving acoustic source, and an undesired spatially moving acoustic source. The method also includes classifying subsequent input of the multiple microphones as one of the acoustic scenarios using the hyperset of features.

In another embodiment, the present disclosure provides a non-transitory computer-readable medium having instructions stored thereon that are capable of causing or configuring a system to perform operations that includes extracting, from input of multiple microphones, a hyperset of features of acoustic sources. The hyperset of features comprises one or more spatial features of the acoustic sources and one or more voice biometric features of the acoustic sources. The operations also include using the extracted hyperset of features to identify separable clusters associated with acoustic scenarios. The acoustic scenarios comprise a desired spatially non-moving talker, a desired spatially moving talker, an undesired spatially non-moving acoustic source, and an undesired spatially moving acoustic source. The operations also include classifying subsequent input of the multiple microphones as one of the acoustic scenarios using the hyperset of features.

In yet another embodiment, the present disclosure provides an apparatus that includes a feature extractor that extracts a hyperset of features of acoustic sources from input of multiple microphones. The hyperset of features comprises one or more spatial features of the acoustic sources and one or more voice biometric features of the acoustic sources. The apparatus also includes a clustering block that uses the extracted hyperset of features to identify separable clusters associated with acoustic scenarios. The acoustic scenarios include a desired spatially non-moving talker, a desired spatially moving talker, an undesired spatially non-moving acoustic source, and an undesired spatially moving acoustic source. The apparatus also includes a classifier that classifies subsequent input of the multiple microphones as one of the acoustic scenarios using the hyperset of features.

DETAILED DESCRIPTION

Figure 1:
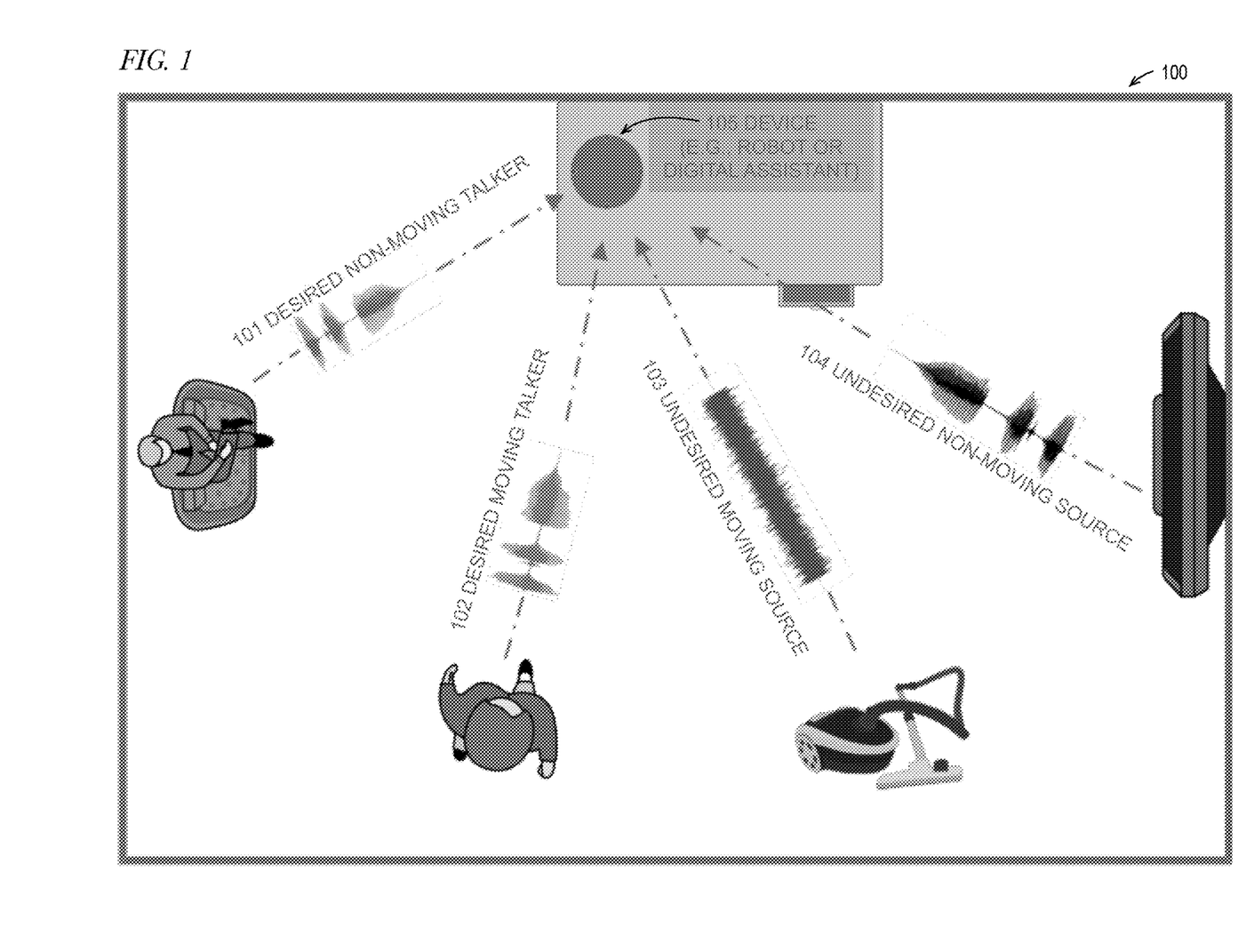
FIG. 1 is an example acoustic environment with sound sources in accordance with embodiments of the present disclosure.

FIG. 1 is an example acoustic environment 100 with sound sources in accordance with embodiments of the present disclosure. FIG. 1 illustrates an example of a reverberant room with a device 105 to be controlled and examples of four different types of acoustic sources. Examples of the device include, but are not limited to, a robot or other assistive device, or a digital assistant such as may be used in a smart home application. The four different types of acoustic sources include a desired spatially non-moving talker 101, a desired spatially moving talker 102, an undesired spatially moving source 103 (e.g., a vacuum cleaner, animals, toys), and an undesired spatially non-moving source 104 (e.g., dishwasher, television, radio). A television or radio may be an example of an undesired spatially non-moving talker 104. An undesired spatially moving/non-moving acoustic source may include an undesired talker or a source of noise/interference. Additionally, an undesired spatially moving/non-moving source 103/104 may also be a talker, e.g., an actual person in the room speaking, who is not enrolled or who is enrolled but who an authorized person has prohibited from controlling the device, e.g., robot or digital assistant, such that the person is essentially an imposter.

Embodiments are described of an apparatus and method for extracting a hyperset of features from the input of multiple microphones, using the extracted features to identify clusters associated with the four different types of acoustic sources 101-104, and classifying subsequent input as one of the four acoustic sources 101-104 using the hyperset of features. The hyperset of features includes both spatial features and voice biometric features of the acoustic sources. The spatial features may include, but are not limited to, phase information, frequency information, room impulse response, direction of arrival angle, (azimuth, elevation), 3-dimensional position coordinates. The voice biometric features may include, but are not limited to, pitch, Mel Frequency Cepstral Coefficients (MFCC), Line Spectral Frequencies (LSF), Higher Order Spectra (HOS) (e.g., bispectrum or trispectrum obtained by Higher Order Spectral Analysis), enrolled speaker presence likelihood, and voice biometric features extracted using a machine learning or spectral analysis-based algorithms. In one embodiment, a voice biometric system generally uses the MFCC as a basic feature set from which probabilistic models are built to determine the enrolled speaker presence likelihood or uses the features extracted from a deep learning network.

Figure 2:
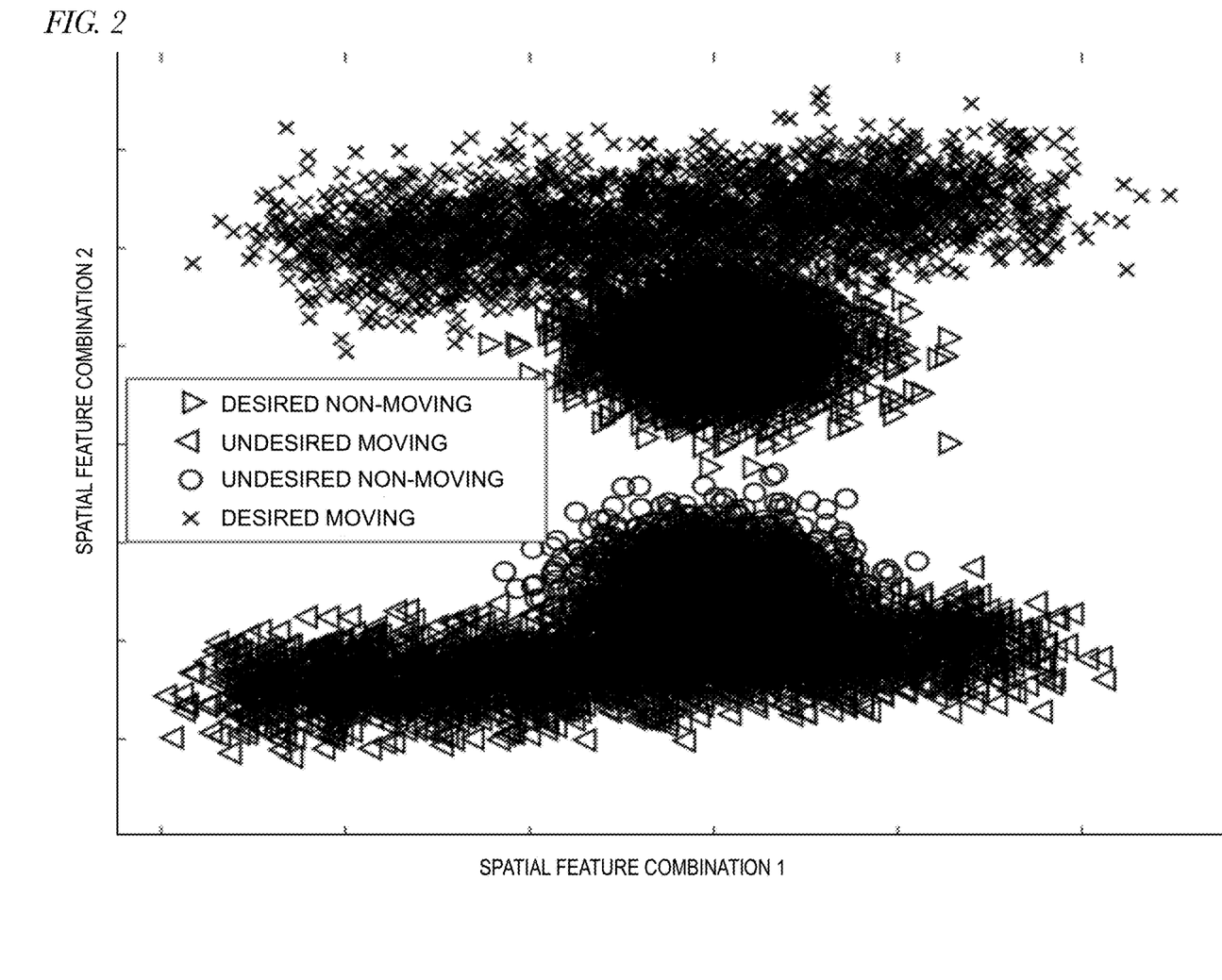
FIG. 2 is an example plot that illustrate, in 2-dimensional space, clusters of the four different acoustic source types of FIG. 1 identified using spatial features extracted from the input of multiple microphones.
Figure 3:
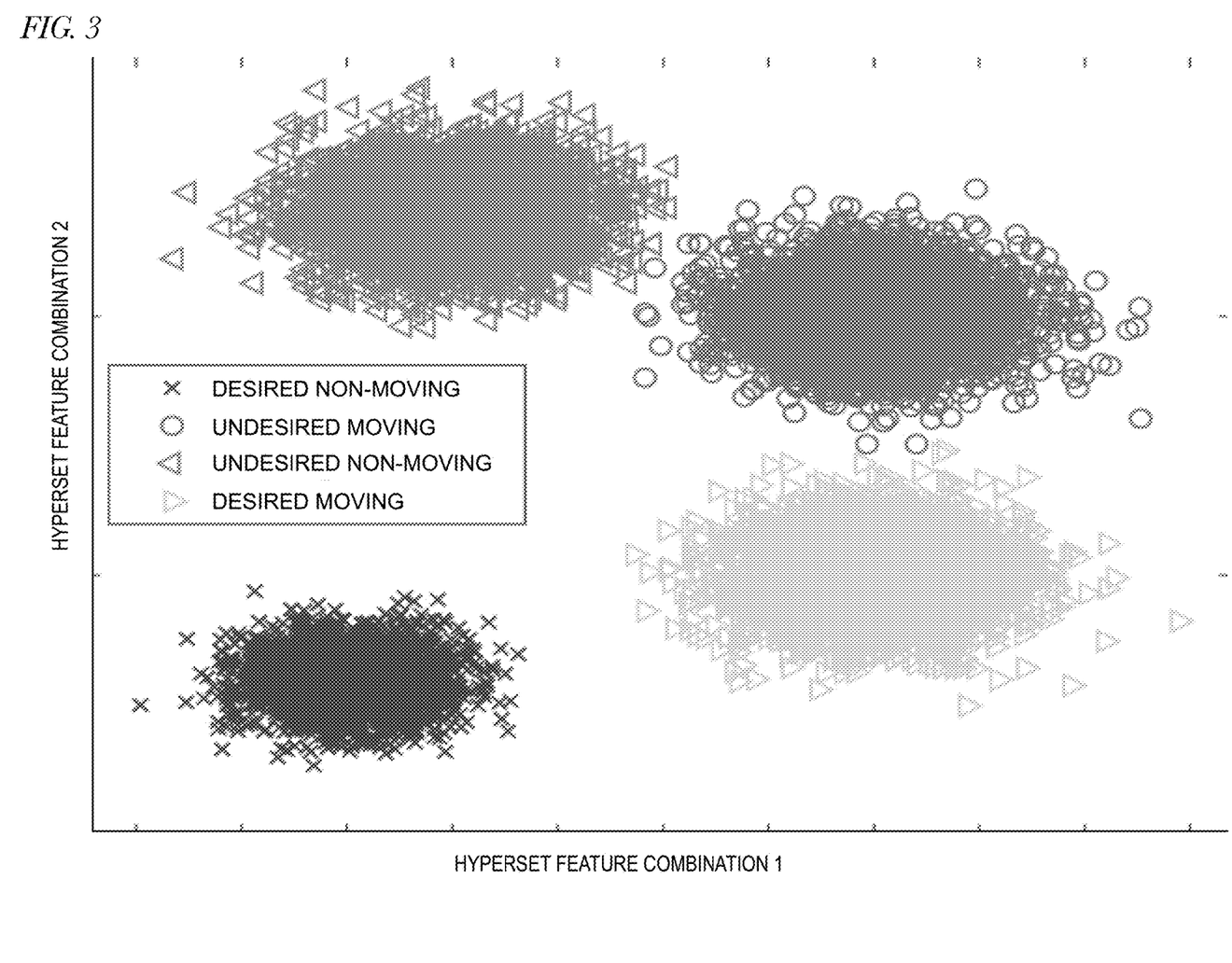
FIG. 3 is an example plot that illustrate, in 2-dimensional space, clusters of the four different acoustic source types of FIG. 1 identified using a hyperset of both spatial and voice biometric features extracted from the input of multiple microphones in accordance with embodiments of the present disclosure.

FIGS. 2 and 3 are example plots that illustrate, in 2-dimensional space, clusters of the four different acoustic source types 101-104 of FIG. 1 identified using features extracted from the input of multiple microphones. In the plot of FIG. 2, only spatial features are extracted from the multi-microphone input and used to identify the clusters; whereas, in the plot of FIG. 3, both spatial features and voice biometric features are used to identify the clusters. The plots of FIGS. 2 and 3 are contrasted with one another to illustrate the improved separability of the clusters when voice biometric features are added to create a hyperset of features.

As may be observed in FIG. 2, clustering without the use of voice biometrics led to overlap of the spatial features. The ambiguity caused by the overlap of the spatial features may render a classifier unable to discriminate subsequent input between the four acoustic sources 101-104 because, as may be observed from FIG. 2, features overlap in the lower dimensional space of FIG. 2 relative to the higher dimensional space of FIG. 3 that also include voice biometric features. In contrast, combining spatial features with voice biometric features to create a hyperset of features moves the acoustic sources into a higher dimensional space in which the four acoustic sources 101-104 are readily separable, as may be observed from FIG. 3. The classifier may now be more capable of identifying the four acoustic sources 101-104 irrespective of whether they are moving or non-moving.

The values of the horizontal axis of FIG. 2, denoted spatial feature combination 1, represent a combination of one or more of the extracted spatial features, and the values of the vertical axis of FIG. 2, denoted spatial feature combination 2, represent a combination of other one or more of the extracted spatial features. For example, spatial feature combination 1 may be azimuth, and spatial feature combination 2 may be elevation. For another example, spatial feature combination 1 may be a linear (or non-linear) combination of phase information and frequency information, and spatial feature combination 2 may be a linear (or non-linear) combination of 3-dimensional position coordinates.

In contrast, advantageously, the values of the horizontal axis of FIG. 3, denoted hyperset feature combination 1, represent a combination of one or more of the extracted hyperset of features, and the values of the vertical axis of FIG. 3, denoted hyperset feature combination 2, represent a combination of other one or more of the extracted hyperset of features. For example, hyperset feature combination 1 may be a linear (or non-linear) combination of azimuth and elevation, and hyperset feature combination 2 may be enrolled speaker likelihood. For another example, hyperset feature combination 1 may be a linear (or non-linear) combination of phase information and frequency information, and hyperset feature combination 2 may be a linear (or non-linear) combination of pitch and LSF and enrolled speaker likelihood.

Thus, although the plots of FIGS. 2 and 3 are both 2-dimensional, i.e., each has a horizontal and vertical axis, each of the two dimensions represent a combination of extracted features. Advantageously, the approach taken in FIG. 3, includes a larger pool of extracted features from which to draw, i.e., a pool of features that includes voice biometric features in addition to spatial features, thus moving the acoustic sources into a higher dimensional space for more readily clustering the four acoustic sources 101-104 and subsequently classifying acoustic source input into the four acoustic source types 101-104, as described in more detail herein.

Figure 4:
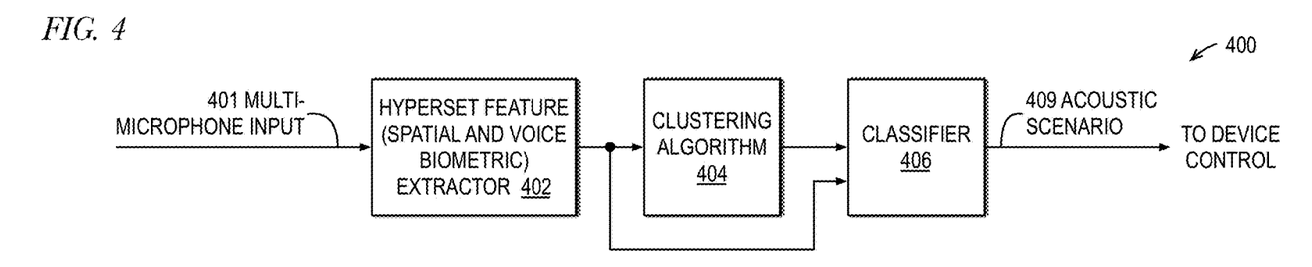
FIG. 4 is an example block diagram illustrating a system for classifying acoustic scenarios using a hyperset of features that includes both spatial and voice biometric features in accordance with embodiments of the present disclosure.

FIG. 4 is a block diagram illustrating a system 400 for classifying acoustic scenarios using a hyperset of features that includes both spatial and voice biometric features in accordance with embodiments of the present disclosure. The system 400 includes a hyperset feature extractor 402 that receives input 401 from multiple microphones driven by one or more acoustic sources, such as the acoustic sources of FIG. 1. The hyperset feature extractor 402 extracts a hyperset of features, i.e., both spatial and voice biometric features, from the input 401 and provides the extracted features to a clustering algorithm block 404 and a classifier 406.

The clustering algorithm block 404 uses the extracted features to identify separable clusters associated with the four acoustic scenarios 101-104 of FIG. 1. The clustering algorithm block 404 may use any of various well-known clustering algorithms to identify the clusters, such as K-Means clustering, Mean-Shift clustering, Density-Based Spatial Clustering of Applications with Noise (DBSCAN), Expectation-Maximization (EM) Clustering using Gaussian Mixture Models (GMM), and Agglomerative Hierarchical Clustering. The clustering algorithm block 404 provides the clustering information to the classifier 406.

The classifier 406 uses the clustering information provided by the clustering algorithm block 404 to classify subsequent hyperset features extracted from the input 401 into one of the four acoustic scenarios 101-104 which it provides as output 409 to a control block of a device. The device may be, for example, a robot or a beamformer, as described below in more detail. Once the clustering is determined from the training data, the centroid of each cluster in the hyper dimensional space can be extracted from the cluster. During the classification stage, a new frame of microphone data is processed to generate the hyperset features, and the distance (e.g., Euclidian, Itakura-Saito distance) between the calculated hyperset and the cluster centroid is calculated for all clusters. The new frame of microphone data is assigned to the cluster whose centroid is closest to the newly generated hyperset feature in the hyper dimensional space. In one embodiment, a processor (e.g., digital signal processor (DSP), microcontroller, or other programmable central processing unit (CPU)) performs the operations of the hyperset feature extractor 402, clustering algorithm block 404, and classifier 406. In other embodiments, dedicated hardware processing blocks may be employed to perform the operations.

Figure 5:
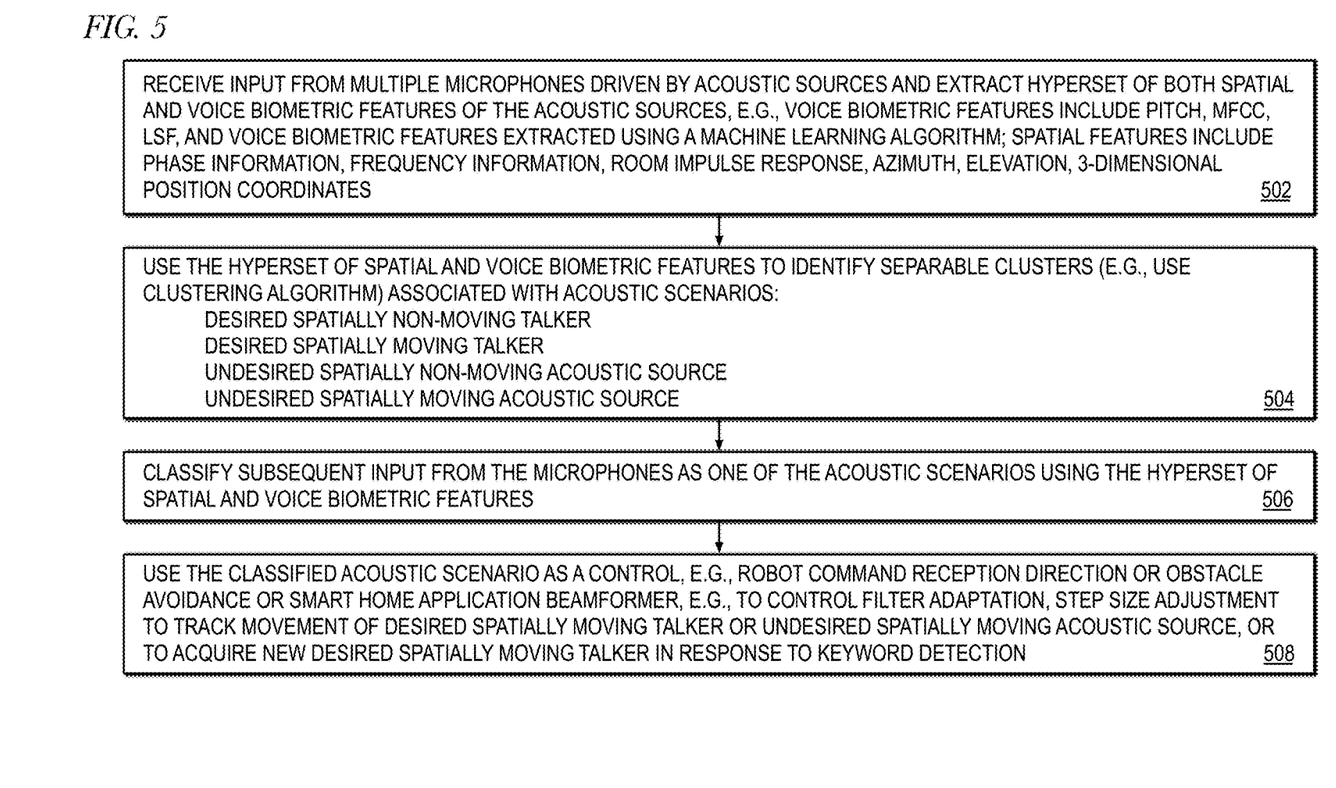
FIG. 5 is an example flow diagram illustrating a method for classifying acoustic scenarios according to embodiments of the present disclosure.

FIG. 5 is a flow diagram illustrating a method for classifying acoustic scenarios, e.g., by operation of system 400 of FIG. 4, according to embodiments of the present disclosure. Operation begins at block 502.

At block 502, input (e.g., input 401 of FIG. 4) is received from multiple microphones driven by acoustic sources (e.g., sources 101-104 of FIG. 1). A hyperset of features (i.e., both spatial and voice biometric) of the acoustic sources is extracted (e.g., by hyperset feature extractor 402 of FIG. 4) from the input. Operation proceeds to block 504.

At block 504, the hyperset of features extracted at block 502 is used (e.g., by the clustering algorithm block 404 of FIG. 4) to identify separable clusters associated with the four acoustic scenarios 101-104. Operation proceeds to block 506.

At block 506, the hyperset of features is extracted from subsequent input and classified (e.g., by the classifier 406 of FIG. 4) as one of the four acoustic scenarios 101-104 (e.g., as output 409 of FIG. 4). Operation proceeds to block 508.

At block 508, the classification (e.g., acoustic scenario 409 of FIG. 4) is used as a control value. In one embodiment, the classification is used to control a robot. For example, if the classification is desired spatially non-moving talker, this may alert the robot to turn in the direction of the desired talker. For another example, if the classification is desired spatially moving talker, this may alert the robot to track the direction of the desired talker. For another example, if the classification is undesired spatially moving/non-moving acoustic source, this may be an indication of an obstacle, which may alert the robot to turn away from the direction of the obstacle.

In an alternate embodiment, the classification is used to control a beamformer. For example, the classification may be used to control adaptation of filters of the beamformer, to adjust a step size of a matched filter to track movement of a desired spatially moving talker or to acquire a new desired spatially moving talker in response to detection of a keyword, or to adjust a step size of a noise canceller to track movement of an undesired spatially moving acoustic source. Use of the classification to control a beamformer may be described in more detail below with respect to the embodiment of FIG. 7.

Figure 6:
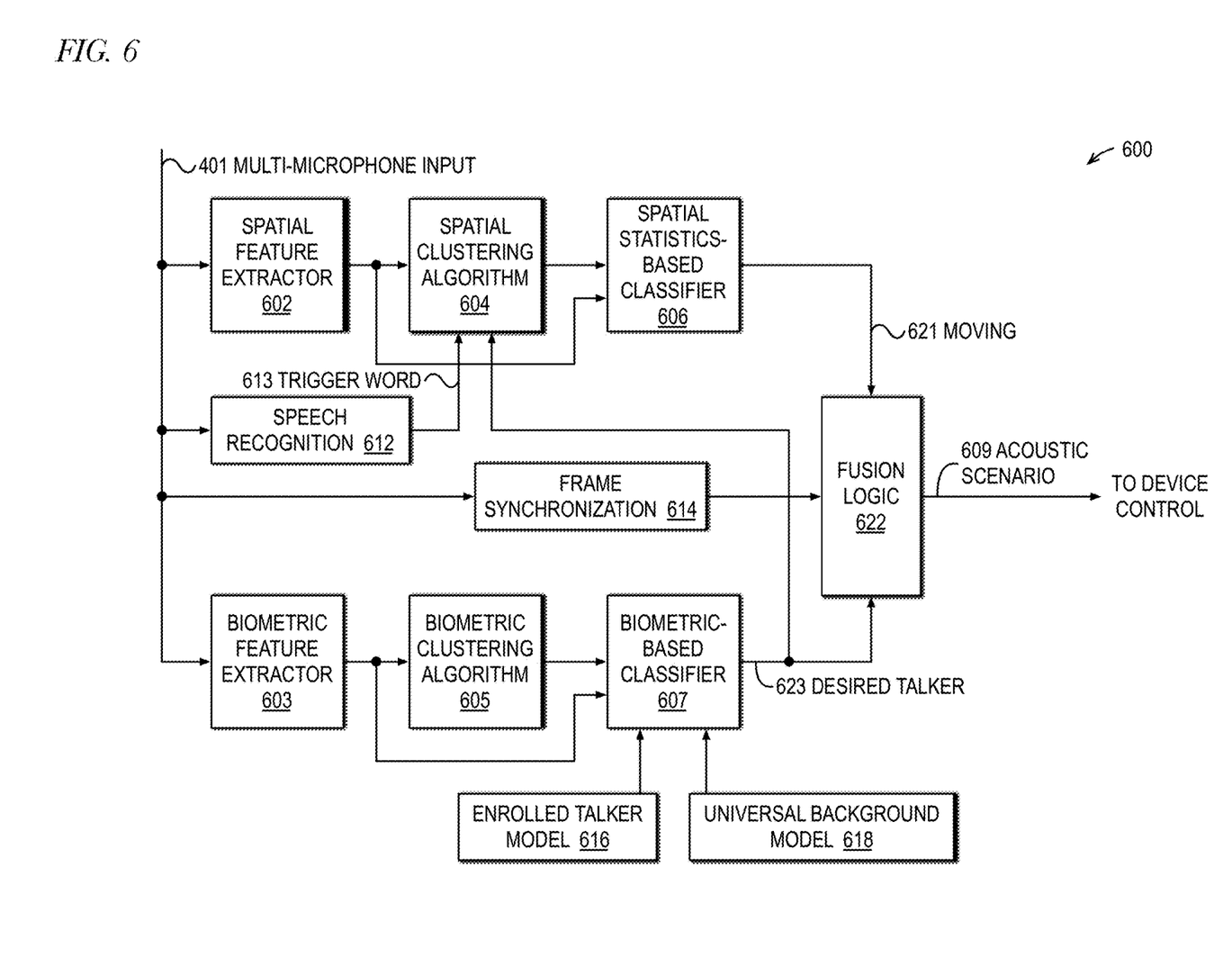
FIG. 6 is an example block diagram of a system for classifying acoustic scenarios using a hyperset of features that includes both spatial and voice biometric features in accordance with embodiments of the present disclosure.

FIG. 6 is a block diagram of a system 600 for classifying acoustic scenarios using a hyperset of features that includes both spatial and voice biometric features in accordance with embodiments of the present disclosure. The system 600 of FIG. 6 is similar in some respects to the system 400 of FIG. 4. However, the system 600 of FIG. 6 separately extracts, clusters and classifies spatial features and voice biometric features and fuses the respective classifications to produce an acoustic scenario output 609 for provision to a control block of a device, such as a robot or beamformer. The system 600 includes a spatial feature extractor 602, a biometric feature extractor 603, a spatial clustering algorithm 604, a biometric clustering algorithm 605, a spatial statistics-based classifier 606, a biometric-based classifier 607, a speech recognition block 612, a frame synchronization block 614, an enrolled talker model 616, an universal background model 618, and fusion logic 622. The enrolled talker model 616 comprises a model that represents person-dependent speech (enrolled speaker) characteristics. The enrolled talker model 616 is trained with speech samples from an enrolled speaker to represent specific speech characteristics, e.g., indications of different vocal tract length, of the enrolled speaker, such as the inhabitant of a home having a device that includes a voice interface. That is, the enrolled talker model 616 stores signatures of enrolled talkers. The universal background model 618 comprises a model that represents person-independent speech characteristics. The universal background model 618 is trained with speech samples from a large set of speakers to represent general speech characteristics and may be obtained a priori.

The spatial feature extractor 602, the biometric feature extractor 603, the speech recognition block 612, and the frame synchronization block 614 all receive the multi-microphone input 401. The spatial feature extractor 602 extracts spatial features from the input 401 and provides the extracted spatial features to the spatial clustering algorithm block 604 and the spatial statistics-based classifier 606. The biometric feature extractor 603 extracts biometric features from the input 401 and provides the extracted biometric features to the biometric clustering algorithm block 605 and the biometric-based classifier 607. The speech recognition block 612 provides an indication 613 to the spatial clustering algorithm 604 whether a trigger word or phrase has been detected. The trigger word/phrase may indicate a change from a current desired spatially moving talker to a new desired spatially moving talker. The speech recognition engine 612 may also identify which talker uttered the keyword.

The biometric clustering algorithm block 605 uses the extracted biometric features to identify separable desired and undesired clusters associated, respectively, with the desired acoustic scenarios 101 and 102 and with the non-desired acoustic scenarios 103 and 104 of FIG. 1. The biometric clustering algorithm block 605 provides the biometric clustering information to the biometric classifier 607.

The biometric classifier 607 uses the biometric clustering information provided by the biometric clustering algorithm block 605, in conjunction with the enrolled talker model 616 and the universal background model 618, to classify subsequent biometric features extracted from the input 401 and to provide a desired talker indication 623 that indicates either the desired acoustic scenarios 101 and 102 or the non-desired acoustic scenarios 103 and 104. The desired talker indication 623 may also identify the talker, which may also be used by the spatial clustering algorithm 604 to label the spatial clusters. The desired talker indication 623 is provided to the spatial clustering algorithm block 604 and to the fusion logic 622.

The spatial clustering algorithm block 604 uses the extracted spatial features, in conjunction with the trigger word indication 613 and the desired talker indication 623, to identify separable spatially moving and non-moving clusters associated, respectively, with the spatially moving acoustic scenarios 102 and 103 and with the spatially non-moving acoustic scenarios 101 and 104 of FIG. 1. The spatial clustering algorithm block 604 provides the clustering information to the spatial classifier 606. The spatial clustering algorithm block 604 may employ a sequential clustering algorithm.

The spatial classifier 606 uses the spatial clustering information provided by the spatial clustering algorithm block 604 to classify subsequent spatial features extracted from the input 401 and to provide a moving indication 621 that indicates either the spatially moving acoustic scenarios 102 and 103 or the spatially non-moving acoustic scenarios 101 and 104. The moving indication 621 is provided to the fusion logic 622.

The frame synchronization block 614 provides information to the fusion logic 622 that enables the fusion logic 622 to align the moving indications 621 received from the spatial statistics-based classifier 606 so that they are associated with corresponding frames of the desired talker 623 indications received from the biometric-based classifier 607. The fusion logic 622 uses the frame synchronization information received from the frame synchronization block 614 to synchronize the moving indication 621 and the desired talker indication 623 for a given frame to generate the acoustic scenario output 609 for the frame.

Figure 7:
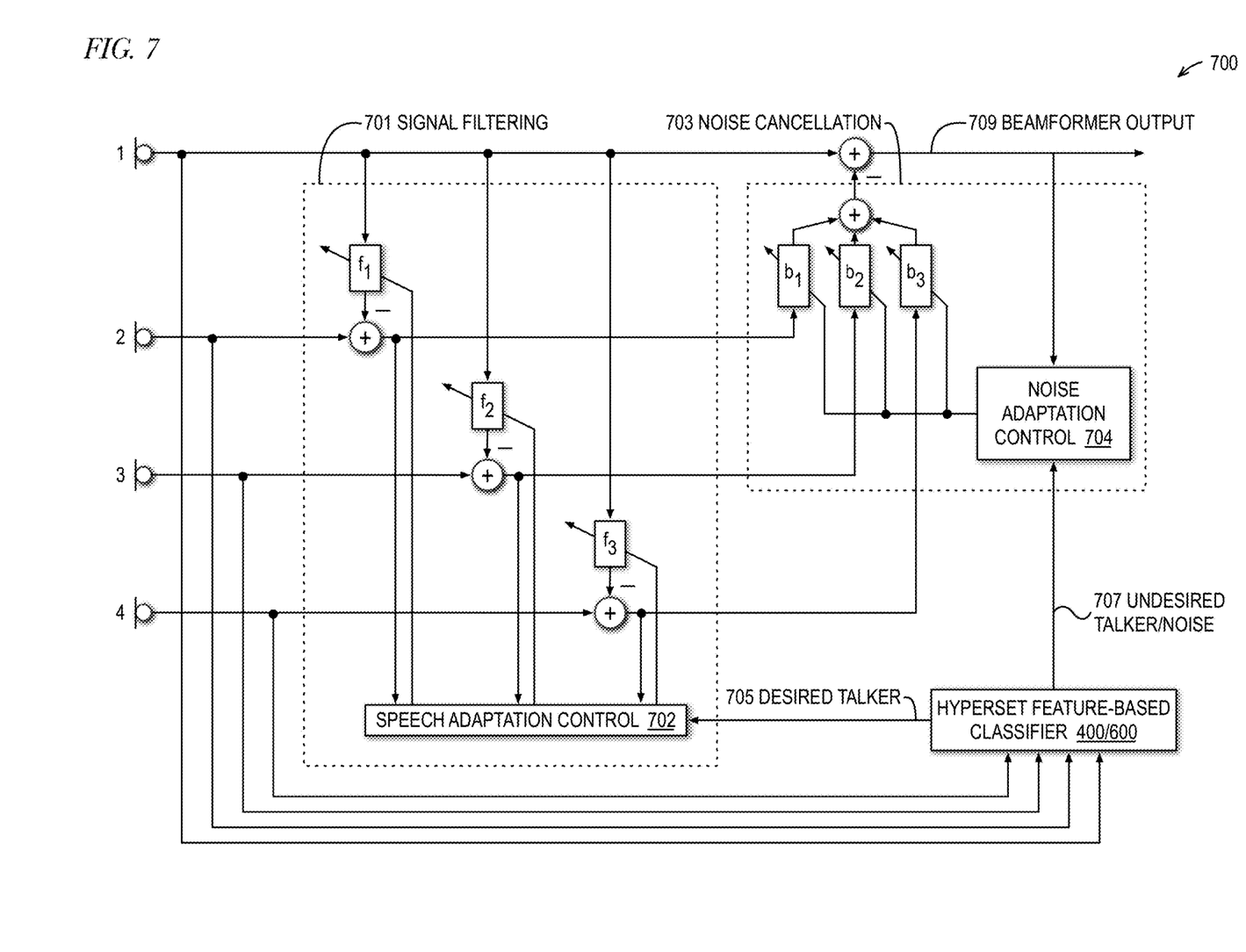
FIG. 7 is an example block diagram of a beamformer in accordance with embodiments of the present disclosure.

FIG. 7 is a block diagram of a beamformer 700 in accordance with embodiments of the present disclosure. The beamformer 700 includes a plurality of microphones (denoted 1, 2, 3, 4 in the embodiment of FIG. 7), a signal filtering block 701, a noise cancellation block 703, and a hyperset feature-based classifier, e.g., system 400 of FIG. 4 or system 600 of FIG. 6. Microphone 1 may be referred to as the primary microphone, or selected voice microphone, and the other microphones may be referred to as secondary microphones that may be used for generating noise references. The signal filtering block 701 includes a speech adaptation control block 702 that controls the adaptation of three speech filters f1, f2, and f3. The noise cancellation block 703 includes a noise adaptation control block 704 that controls the adaptation of three noise cancellation filters b1, b2, and b3. Generally, the signal filtering block 701 reduces desired speech leakage in the noise references, and the noise cancellation block 703 adaptively cancels the noise that is present in the primary microphone.

The hyperset feature-based classifier 400/600 receives the input from each of the microphones 1-4 and generates an acoustic scenario output 409/609 in accordance with the operation described above, e.g., with respect to FIG. 5. The acoustic scenario output 409/609 may be used to generate a desired talker indication 705 provided to the speech adaption control block 702. For example, the desired talker indication 705 may be true if the acoustic scenario output 409/609 indicates a desired spatially moving talker 102 or a desired spatially non-moving talker 101, and the desired talker indication 705 may be false if the acoustic scenario output 409/609 indicates an undesired spatially moving acoustic source 103 or an undesired spatially non-moving acoustic source 104. Additionally, the acoustic scenario output 409/609 may be used to generate an undesired talker/noise indication 707 provided to the noise adaption control block 704. For example, the undesired talker/noise indication 707 may be false if the acoustic scenario output 409/609 indicates a desired spatially moving talker 102 or a desired spatially non-moving talker 101, and the undesired talker/noise indication 707 may be true if the acoustic scenario output 409/609 indicates an undesired spatially moving acoustic source 103 or an undesired spatially non-moving acoustic source 104. The speech adaption control block 702 may adapt (e.g., update coefficients of) the speech filters f1-f3 when the desired talker indication 705 is true and otherwise not, and the noise adaption control block 704 may adapt the noise cancellation filter b1-b3 when the undesired talker/noise indication 707 is true and otherwise not, as described below.

The signal filtering block 701 comprises multiple adaptive filters f1-f3, each of which receives the primary microphone as an input and attempts to extract the enrolled talker's speech so that it may be subtracted from an associated secondary microphone to produce the noise in the secondary microphone signal as an associated noise reference. A first summing node subtracts the output of filter f1 from a delayed version of microphone 2. The output of the first summing node is a first noise reference that is used by the speech adaptation control block 702 to adapt filter f1. A second summing node subtracts the output of filter f2 from a delayed version of microphone 3. The output of the second summing node is a second noise reference that is used to adapt filter f2. A third summing node subtracts the output of filter f3 from a delayed version of microphone 4. The output of the third summing node is a third noise reference that is used to adapt filter f3. Generally, the function of the signal filtering block 701 is to block the talker's speech and generate the noise references for the noise cancellation block 703.

The filters f1-f3 are controlled by control signals generated by the speech adaptation control block 702. Speech from a non-enrolled talker may be present in the input from the microphones, e.g., from a TV. It may be desirable to treat the TV speech as speech noise and remove it from the primary microphone. Advantageously, the desired talker indication 705 from the hyperset feature-based classifier 400/600 may enable the beamformer 700 to distinguish instances in which speech of an enrolled talker is present from instances in which speech noise is the only speech present, e.g., speech from a TV is present but not from an enrolled talker. The speech adaptation control block 702 controls the adaptive filters f1-f3 to adapt only in instances in which a desired talker's speech is present, which may enable the effective removal of speech noise (e.g., from a TV) from the primary microphone so that the speech noise is not present in the beamformer output 709.

The noise cancellation block 703 comprises multiple adaptive filters denoted b1, b2, and b3, which receive the associated noise references as an input from the respective summation nodes of the signal filtering block 701. A fourth summing node sums the outputs of adaptive filters b1-b3. A fifth summing node subtracts the output of the fourth summing node from a delayed version of the primary microphone signal to generate the beamformer output 709, which is used to adapt the filters b1-b3. The noise adaptation control block 704 controls the adaptive filters b1-b3 to adapt only when the enrolled talker's speech is not present, as indicated by the undesired talker/noise indication 707 provided by the hyperset feature-based classifier 400/600. The noise cancellation block 703 uses the noise generated by the signal filtering block 701 and cancels the noise from the primary microphone signal. The adaptive filters may be implemented either in the time domain or in the frequency domain. In the frequency domain approach, the time domain microphone signals are first transformed into the frequency domain using a fast Fourier transform/filter bank and the transformed signal from each filter bank output is processed separately.

In addition to controlling when to adapt the filters, the desired talker indication 705 and the undesired talker/noise indication 707 provided by the hyperset feature-based classifier 400/600 may be used by the speech adaption control block 702 and the noise adaptation control block 704 to control other aspects of the beamformer 700. Examples include adjusting a step size of the matched filters f1-f3 to track movement of a desired spatially moving talker or to acquire a new desired spatially moving talker in response to detection of a keyword. Other examples include adjusting a step size of the noise cancelling filters b1-b3 to track movement of an undesired spatially moving acoustic source. Thus, because the hyperset feature-based classifier 400/600 may provide a high-quality acoustic scenario output 409/609 due to its high dimensionality by combining both the spatial features and the voice biometric features as described above, the beamformer 700 may provide an enhanced signal quality, e.g., a signal-to-noise ratio (SNR) improvement, in the output 709, over a conventional arrangement that uses only spatial features or only biometric features.

Figure 8:
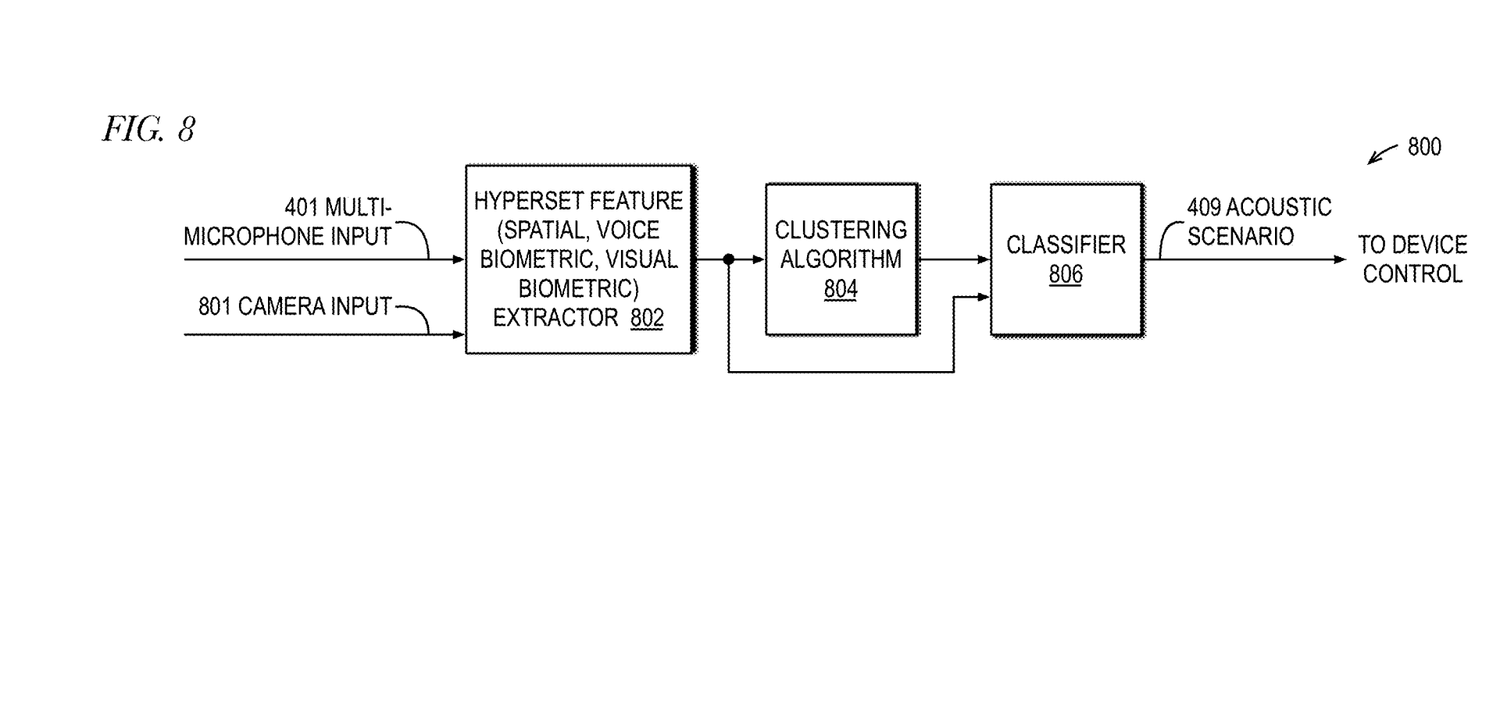
FIG. 8 is an example block diagram illustrating a system for classifying acoustic scenarios using a hyperset of features that includes spatial, voice biometric and visual biometric features in accordance with embodiments of the present disclosure.

FIG. 8 is a block diagram illustrating a system 800 for classifying acoustic scenarios using a hyperset of features that includes spatial, voice biometric and visual biometric features in accordance with embodiments of the present disclosure. The system 800 is similar in many respects to the system 400 of FIG. 4. However, in the system 800 of FIG. 8, a hyperset feature extractor 802 receives not only input 401 from multiple microphones, but also receives input 801 from at least one camera. The hyperset feature extractor 802 extracts a hyperset of features that includes spatial, voice biometric, visual and other biometric features, from the inputs 401 and 801 and provides the extracted features to a clustering algorithm block 804 and a classifier 806. The visual biometric features may include facial identification information, retina scan information, infrared camera images and other biometric features including fingerprint information, ear scan, or ultrasonic audio information.

The clustering algorithm block 804 uses the extracted features to identify separable clusters associated with the four acoustic scenarios 101-104 of FIG. 1. The clustering algorithm block 804 provides the clustering information to a classifier 806.

The classifier 806 uses the clustering information provided by the clustering algorithm block 804 to classify subsequent hyperset features extracted from the inputs 401 and 801 into one of the four acoustic scenarios 101-104 which it provides as output 409 to a control block of a device. The addition of the extracted visual biometric features may provide an even higher dimensional space in which the four acoustic sources 101-104 are even more readily separable.

Figure 9:
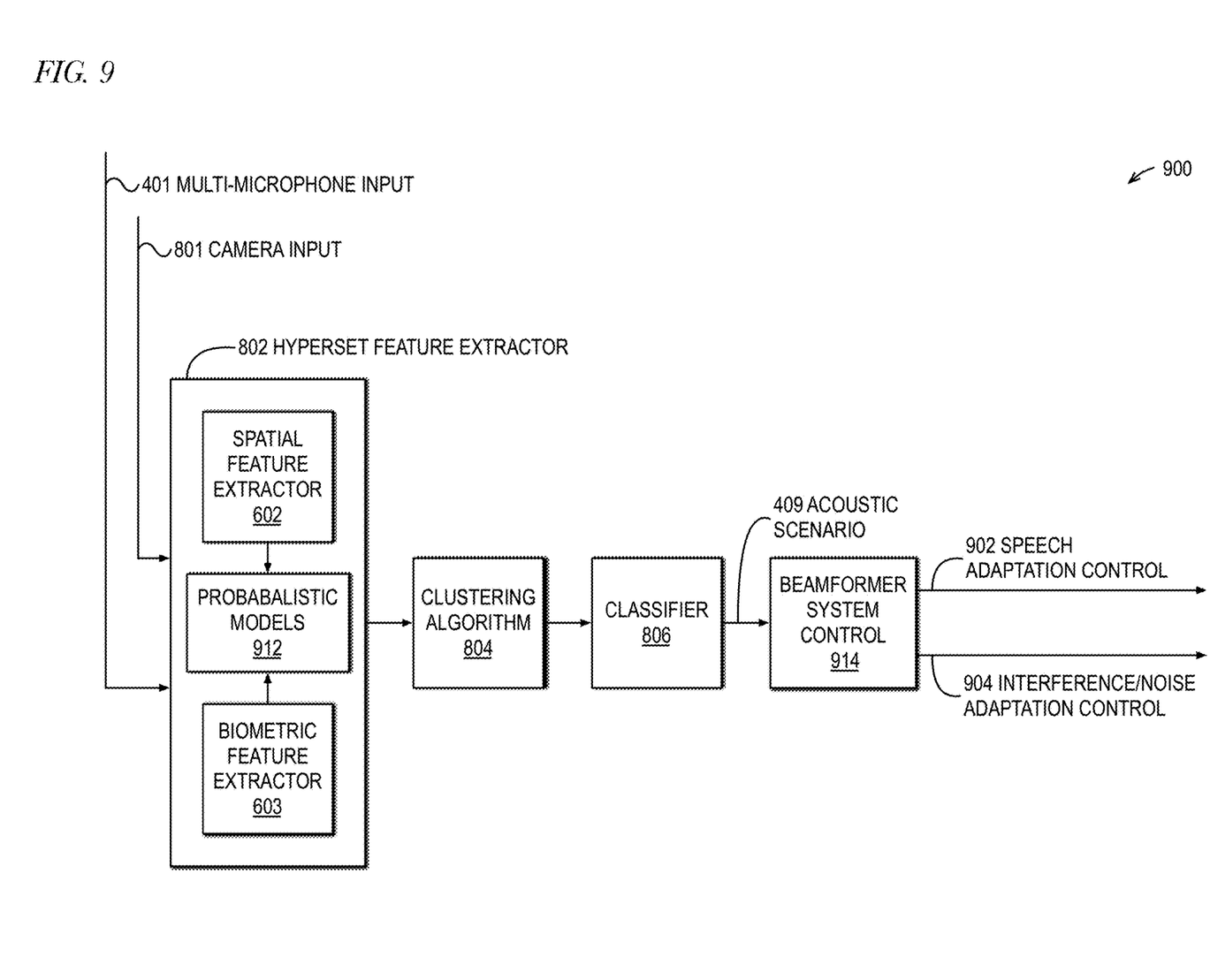
FIG. 9 is an example block diagram illustrating a system for classifying acoustic scenarios using a hyperset of features that includes spatial, voice biometric and visual biometric features to assist in beamforming system control in accordance with embodiments of the present disclosure.

FIG. 9 is an example block diagram illustrating a system 900 for classifying acoustic scenarios using a hyperset of features that includes spatial, voice biometric and visual biometric features to assist in beamforming system control in accordance with embodiments of the present disclosure. The system 900 is similar in many respects to the system 800 of FIG. 8 in that it includes a hyperset feature extractor 802, a clustering algorithm 804 and a classifier 806, and the hyperset feature extractor 802 receives a multi-microphone input 401 and a camera input 801, and the classifier generates an acoustic scenario 409, all of which may be similar to like-numbered elements described above. However, the system 900 of FIG. 9 also includes a beamformer system control block 914 that receives the acoustic scenario 409. The beamformer system control block 914 uses the acoustic scenario 409 to generate a speech adaptation control signal 902 and an interference/noise adaptation control signal 904 that may be used to control a beamformer, e.g., respectively, speech adaptation control block 702 and noise adaptation control block 704 of beamformer 700 of FIG. 7. Additionally, in the embodiment of FIG. 9, the hyperset feature extractor 802 may include a spatial feature extractor 602 and biometric feature extractor 603 such as described with respect to FIG. 6, as well as probabilistic models 912 that receive the outputs of the extractors 602/603 and use them to generate the hyperset feature extractor 402 output provided to the clustering algorithm 804.

Data from non-moving sources will tend to cluster tightly, and conventionally the tight clusters have been treated as noise clusters. Data from a moving source does not tend to cluster and is conventionally treated as a talker. A drawback of the conventional approach is that a non-moving talker may be treated as noise or a moving noise source may be clustered as a desired source. The spatial feature-based algorithm alone does not identify specific talkers.

Embodiments have been described that utilize spatial features as well as voice biometric features to classify sound sources into four types of clusters: desired and spatially non-moving, desired and spatially moving, interferer and spatially non-moving, interferer and spatially moving. In one embodiment (e.g., of FIG. 6), a spatial feature extractor determines the spatial features such as phase, phase-frequency, direction of arrival (azimuth and elevation), 3-D position coordinates or room impulse response, and a clustering algorithm packs the spatial data into its perspective cluster. The spatial algorithm may only determine the location and kinematics of the sound source, e.g., spatially moving or non-moving, but does not determine the identity of the sound source. Desired talkers are enrolled a priori into the system, and their biometric features are kept in a database. A biometrics engine extracts biometric features from the input at the microphone from each arriving source at a given time interval. The biometric features may include but not limited to pitch, MFCC, LSF, HOS, enrolled speaker presence likelihood, or any other forms of biometrics features that may be derived by means of machine learning or spectral analysis algorithms. A biometrics clustering algorithm determines cluster membership of the extracted biometric features. A biometrics classifier determines the nature of each source, e.g., desired or undesired, but does not identify the location or kinematics of the source. Information from the spatial and biometric clustering is time synchronized and fused together to identify information from each time frame both in biometric and spatial feature dimensions. The fusion logic synchronizes and associates the biometric features to the spatial features that are extracted from the same source.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A method, comprising:
extracting, from input of multiple microphones, a hyperset of features of acoustic sources;
wherein the hyperset of features comprises one or more spatial features of the acoustic sources and one or more voice biometric features of the acoustic sources;
using the extracted hyperset of features to identify separable clusters associated with acoustic scenarios;
wherein the acoustic scenarios comprise:
a desired spatially non-moving talker;
a desired spatially moving talker;
an undesired spatially non-moving acoustic source; and
an undesired spatially moving acoustic source; and
classifying subsequent input of the multiple microphones as one of the acoustic scenarios using the hyperset of features.

2. The method of claim 1,
wherein the one or more spatial features comprise one or more from the list:
phase information, frequency information, room impulse response, angle of arrival in azimuth and elevation directions, 3-dimensional position coordinates; and wherein the one or more voice biometric features comprise one or more from the list:
pitch, Mel Frequency Cepstral Coefficients (MFCC), Line Spectral Frequencies (LSF), Higher Order Spectra, enrolled speaker presence likelihood, and voice biometric features extracted using machine learning or spectral analysis-based algorithms.

3. The method of claim 1, further comprising:
enrolling one or more desired talkers prior to said using the extracted hyperset of features to identify separable clusters associated with acoustic scenarios.

4. The method of claim 1, further comprising:
using the classified one of the acoustic scenarios in a robotics application to alert a robot to turn in a direction of a desired talker or to alert the robot to avoid obstacles.

5. The method of claim 1, further comprising:
using the classified one of the acoustic scenarios to generate a control signal to adapt a beamformer in a smart home application.

6. The method of claim 5,
wherein said classifying subsequent input of the multiple microphones as one of the acoustic scenarios using the hyperset of features comprises:
using the voice biometric features to make a discrimination between a desired talker and undesired talkers or interference.

7. The method of claim 6,
wherein said using the classified one of the acoustic scenarios to generate a control signal to adapt a beamformer in a smart home application comprises:
combining the input of the multiple microphones to enhance a desired signal using the classified one of the acoustic scenarios.

8. The method of claim 7,
wherein said using the classified one of the acoustic scenarios to generate a control signal to adapt a beamformer in a smart home application comprises:
allowing the beamformer to adapt a matched filter and a noise canceller in a reverberant environment with competing noise sources.

9. The method of claim 1, further comprising:
in response to the classified one of the acoustic scenarios being a desired spatially moving talker, adjusting a step size of a matched filter to track movement of the desired spatially moving talker.

10. The method of claim 1, further comprising:
detecting a change from a desired spatially moving talker to a new desired spatially moving talker based on detection of a key word or key phrase spoken by the new desired spatially moving talker; and
adjusting the step size of a matched filter to acquire the new desired spatially moving talker.

11. The method of claim 1, further comprising:
in response to the classified one of the acoustic scenarios being an undesired spatially moving talker or an undesired spatially moving acoustic source, adjusting a step size of a noise canceller to track movement of the undesired spatially moving talker or the undesired spatially moving acoustic source.

12. The method of claim 1,
wherein said classifying subsequent input of the multiple microphones as one of the acoustic scenarios using the hyperset of features comprises:
using the one or more spatial features to make a first moving/non-moving determination;

using the one or more voice biometric features to make a second desired/undesired talker determination; and fusing the first and second determinations to perform said classifying subsequent input of the multiple microphones as one of the acoustic scenarios using the hyperset of features.

13. The method of claim 1, wherein the hyperset of features further comprises visual biometric features extracted from one or more cameras viewing the acoustic sources.

14. A non-transitory computer-readable medium having instructions stored thereon that are capable of causing or configuring a system to perform operations comprising:

extracting, from input of multiple microphones, a hyperset of features of acoustic sources;

wherein the hyperset of features comprises one or more spatial features of the acoustic sources and one or more voice biometric features of the acoustic sources;

using the extracted hyperset of features to identify separable clusters associated with acoustic scenarios;

wherein the acoustic scenarios comprise:
a desired spatially non-moving talker;
a desired spatially moving talker;
an undesired spatially non-moving acoustic source; and
an undesired spatially moving acoustic source; and classifying subsequent input of the multiple microphones as one of the acoustic scenarios using the hyperset of features.

15. The non-transitory computer-readable medium of claim 14, wherein the one or more spatial features comprise one or more from the list:
phase information, frequency information, room impulse response, angle of arrival in azimuth and elevation directions, 3-dimensional position coordinates; and wherein the one or more voice biometric features comprise one or more from the list:
pitch, Mel Frequency Cepstral Coefficients (MFCC), Line Spectral Frequencies (LSF), Higher Order Spectra, enrolled speaker presence likelihood, and voice biometric features extracted using machine learning or spectral analysis-based algorithms.

16. The non-transitory computer-readable medium of claim 14, further comprising:

using the classified one of the acoustic scenarios in a robotics application to alert a robot to turn in a direction of a desired talker or to alert the robot to avoid obstacles.

17. The non-transitory computer-readable medium of claim 14, further comprising:

using the classified one of the acoustic scenarios to generate a control signal to adapt a beamformer in a smart home application.

18. The non-transitory computer-readable medium of claim 14, wherein said classifying subsequent input of the multiple microphones as one of the acoustic scenarios using the hyperset of features comprises:
using the one or more spatial features to make a first moving/non-moving determination;
using the one or more voice biometric features to make a second desired/undesired talker determination; and
fusing the first and second determinations to perform said classifying subsequent input of the multiple microphones as one of the acoustic scenarios using the hyperset of features.

19. The non-transitory computer-readable medium of claim 14, wherein the hyperset of features further comprises visual biometric features extracted from one or more cameras viewing the acoustic sources.

20. An apparatus, comprising:

a feature extractor that extracts a hyperset of features of acoustic sources from input of multiple microphones;

wherein the hyperset of features comprises one or more spatial features of the acoustic sources and one or more voice biometric features of the acoustic sources;

a clustering block that uses the extracted hyperset of features to identify separable clusters associated with acoustic scenarios;

wherein the acoustic scenarios comprise:
a desired spatially non-moving talker;
a desired spatially moving talker;
an undesired spatially non-moving acoustic source; and
an undesired spatially moving acoustic source; and a classifier that classifies subsequent input of the multiple microphones as one of the acoustic scenarios using the hyperset of features.

* * * * *